(12) United States Patent
Hashizume

(10) Patent No.: US 9,207,390 B2
(45) Date of Patent: Dec. 8, 2015

(54) LIGHT GUIDE STRUCTURES AND DISPLAY DEVICES

(75) Inventor: Kenichi Hashizume, Gunma (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 206 days.

(21) Appl. No.: 13/817,775

(22) PCT Filed: Jun. 14, 2012

(86) PCT No.: PCT/JP2012/003906
§ 371 (c)(1),
(2), (4) Date: Feb. 19, 2013

(87) PCT Pub. No.: WO2013/186819
PCT Pub. Date: Dec. 19, 2013

(65) Prior Publication Data
US 2014/0192559 A1    Jul. 10, 2014

(51) Int. Cl.
*F21V 8/00* (2006.01)

(52) U.S. Cl.
CPC ............ *G02B 6/0075* (2013.01); *G02B 6/0003* (2013.01); *G02B 6/0078* (2013.01); *G02B 6/0055* (2013.01)

(58) Field of Classification Search
CPC .. G02B 6/0073; G02B 6/0011; G02B 6/0031; G02B 6/0035; G02B 6/0036; G02B 6/0061; G02B 6/0068; G02B 6/0078; G02B 6/0088; G02B 19/0028; G02B 6/0038; G02B 6/0043; G02B 6/0003; G02B 6/0005; G02B 6/0055; G02B 6/0075; G02B 1/045; G02F 1/133615; G02F 1/133606; G02F 1/133621; G02F 2001/133614; F21K 9/52; F21Y 2101/02; F21V 9/16; G03B 21/204; C09K 11/06; A61B 1/0653; B29D 11/00663

USPC ......... 362/609, 608, 612, 611, 613, 615, 616, 362/231, 311.02, 559, 621, 623, 626, 628, 362/629, 97.1; 349/62; 257/98; 345/84; 348/790; 359/230, 245
See application file for complete search history.

(56) References Cited

U.S. PATENT DOCUMENTS 5,608,550 A    3/1997    Epsteiin et al.
5,764,845 A    6/1998    Nagatani et al.
(Continued)

FOREIGN PATENT DOCUMENTS

CN    101295099 A    10/2008
CN    101750668       6/2010
(Continued)

OTHER PUBLICATIONS

Acryl Based Elastomer "Kurarity", Information was available at website; http://www.kuraray.co.jp/en/products/chemical/kurarity.html; in some form no later than May 25, 2011. While no copy of the website as it existed on May 25, 2011, is in Applicant's possession, Applicant has provided a copy of the website that was printed on Dec. 13, 2012.

(Continued)

*Primary Examiner* — Stephen F Husar
*Assistant Examiner* — Danielle Allen
(74) *Attorney, Agent, or Firm* — Knobbe, Martens, Olson & Bear, LLP

(57) ABSTRACT

Light guide structures that include a transparent plate having a first end and a second end; and a plurality of transparent light guide members, each transparent light guide member extending from the first end to the second end along one surface of the transparent plate and being configured to emit white light in response to light applied thereto are described.

6 Claims, 2 Drawing Sheets

(56) References Cited

U.S. PATENT DOCUMENTS

| | | |
|---|---|---|
| 5,799,126 A | 8/1998 | Nagatani et al. |
| 7,969,531 B1 | 6/2011 | Li et al. |
| 8,061,882 B2 | 11/2011 | Bita et al. |
| 8,155,489 B2 | 4/2012 | Saarikko et al. |
| 8,840,295 B2 | 9/2014 | Kuroki et al. |
| 2001/0030860 A1 | 10/2001 | Kimura et al. |
| 2002/0163791 A1 | 11/2002 | Hoelen et al. |
| 2005/0030732 A1 | 2/2005 | Kimura et al. |
| 2007/0177406 A1 | 8/2007 | Kimura et al. |
| 2008/0225202 A1 | 9/2008 | Joo et al. |
| 2008/0252818 A1 | 10/2008 | Wu et al. |
| 2008/0266902 A1 | 10/2008 | Zheng |
| 2009/0129053 A1 | 5/2009 | Tsai |
| 2009/0129115 A1 | 5/2009 | Fine et al. |
| 2009/0175050 A1 | 7/2009 | Marttila et al. |
| 2009/0219734 A1 | 9/2009 | Sawada et al. |
| 2009/0316069 A1 | 12/2009 | Kimura et al. |
| 2010/0002466 A1* | 1/2010 | Kim et al. ............ 362/615 |
| 2010/0135041 A1 | 6/2010 | Niu |
| 2010/0207933 A1 | 8/2010 | Suzuki et al. |
| 2010/0253881 A1 | 10/2010 | Han et al. |
| 2012/0081920 A1* | 4/2012 | Ie et al. ............ 362/609 |
| 2012/0105765 A1 | 5/2012 | Kawai et al. |
| 2013/0141937 A1 | 6/2013 | Katsuta |

FOREIGN PATENT DOCUMENTS

| | | |
|---|---|---|
| CN | 101793366 | 8/2010 |
| JP | 07-098413 | 4/1995 |
| JP | 07-098416 | 4/1995 |
| JP | 2002-015612 | 1/2002 |
| JP | 2003-098354 | 4/2003 |
| JP | 2003-162241 | 6/2003 |
| JP | 2006-073202 | 3/2006 |
| JP | 2008242454 A | 10/2008 |
| JP | 2008-277286 | 11/2008 |
| JP | 2009-016289 | 1/2009 |
| JP | 2010-152370 | 7/2010 |
| JP | 2010-177153 | 8/2010 |
| JP | 2010-212264 | 9/2010 |
| JP | 2010-244013 | 10/2010 |
| JP | 2011-086637 | 4/2011 |
| TW | 200428045 B | 2/2007 |
| TW | 200825488 A | 6/2008 |
| TW | 200841085 A | 10/2008 |
| TW | 201003240 A | 1/2010 |
| WO | WO 2012/020636 | 2/2012 |
| WO | WO 2012-039354 | 3/2012 |
| WO | PCT/2012/004741 | 7/2012 |

OTHER PUBLICATIONS

Development of Novel Transparent Fluorescent Compounds and Their Application to Emission Devices, Information was available at website; www.toshiba.co.jp/tech/review/2007/05/62_05pdf/f01.pdf; in some form no later than May 25, 2011. While no copy of the website as it existed on May 25, 2011, is in Applicant's possession, Applicant has provided a copy of the website that was printed on Dec. 13, 2012.
Hasegawa et al., "Enhanced Emission of Duterated Tris(hexafluoroacetylacetonato)neodymium(III) Complex in Dolution by Suppresion of Radiationless Transition via Vibrational Excitation," Chem. Phys. Lett., 1996.
Hasegawa et al., "Luminescence of Novel Neodymium Sulfonylaminate in Organic Media," Angew. Chem., 2000, p. 357, vol. 39.
Intelligent Dynamic LED (Sony); Information was available at website: http://www.sonyinsider.com/2010/06/08/the-difference-between-the-sony-bravia-xbr8-and-hx900/; in some form no later than May 25, 2011. While no copy of the website as it existed on May 25, 2011, is in Applicant's possession, Applicant has provided a copy of the website that was printed on Dec. 13, 2012.
Interferometric Display; information was available at website: http://www.mirasoldisplays.com/, in some form no later than May 25, 2011. While no copy of the website as it existed on May 25, 2011, is in Applicant's possession, Applicant has provided a copy of the website that was printed on Nov. 29, 2012.
International Search Report dated Oct. 9, 2012, received in International Application PCT/JP2012/004741, filed Jul. 25, 2012.
International Search Report received in International Application No. PCT/JP2012/003906, filed on Jun. 14, 2012, dated Sep. 18, 2012.
Local Dimming, Information was available at website: http://www.displayblog.com/wp-content/uploads/2008/08/samsung_40_led_blu_02.jpg; in some form no later than May 25, 2011. While no copy of the website as it existed on May 25, 2011, is in Applicant's possession, Applicant has provided a copy of the website that was printed on Dec. 13, 2012.
Olefin Based Elastomer "Zeras", Information was available at website; http://www.mcc-spd.com/en/product/zelas/zelas.html; in some form no later than May 25, 2011. While no copy of the website as it existed on May 25, 2011, is in Applicant's possession, Applicant has provided a copy of the website that was printed on Dec. 13, 2012.
Oriel Instruments, Metallic Reflector Coating; Information was available at website; www.molalla.com/~leeper/refcoat.pdf; in some form no later than May 25, 2011. While no copy of the website as it existed on May 25, 2011, is in Applicant's possession, Applicant has provided a copy of the website that was printed on Dec. 13, 2012.
Polyurethane Based Elastomer "Visela", Information was available at website; http://www.inoac.co.jp/kasei/products/material/visela/index.html; in some form no later than May 25, 2011. While no copy of the website as it existed on May 25, 2011, is in Applicant's possession, Applicant has provided a copy of the website that was printed on Dec. 13, 2012.
Powerpoint Presentation: Meeting Room of Kansai Economic Federation, Dec. 7, 2005, (with English translation).
Sanken Electric Introducing the MCM Module on Light Guide Plate to Realize the Edge-Type Local Dimming; Information was available at website; http://techon.nikkeibp.co.jp/article/NEWS/20091006/176134/, in some form no later than May 25, 2011. While no copy of the website as it existed on May 25, 2011, is in Applicant's possession, Applicant has provided a copy of the website that was printed on Dec. 13, 2012.
Seiko Epson, OLED Frontlight, information was available at website: http://www.stellacorp.co.jp/media/interview_past/0810_epson.html, in some form no later than May 25, 2011. While no copy of the website as it existed on May 25, 2011, is in Applicant's possession, Applicant has provided a copy of the website that was printed on Oct. 15, 2012.
Silicone Rubber "Opticrysta", Information was available at website; http://www.fujipoly.co.jp/products/other_06/Igf/index.htm; in some form no later than May 25, 2011. While no copy of the website as it existed on May 25, 2011, is in Applicant's possession, Applicant has provided a copy of the website that was printed on Dec. 13, 2012.
Sony's Intelligent Dynamic LED Technology Realizing Edge-Type Local Dimming; Information was available at website: http://sonyinsider.com/wp-content/uploads/2010/06/sony2_42.jpg; in some form no later than May 25, 2011. While no copy of the website as it existed on May 25, 2011, is in Applicant's possession, Applicant has provided a copy of the website that was printed on Dec. 13, 2012.
Styrene Based Elastomer "Rabalon", Information was available at website; http://www.mcc-spd.com/en/product/rabalon/rabalon.html; in some form no later than May 25, 2011. While no copy of the website as it existed on May 25, 2011, is in Applicant's possession, Applicant has provided a copy of the website that was printed on Dec. 13, 2012.
Suemasu et al., "Optimum Annealing Condition for 1.5 µm Photoluminescence from β-$FeSi_2$ Balls Grown by Rective Deposition Epitaxy and Embedded in Si Crystal," Journal of Luminescence, 2000, pp. 528-531, vol. 87-89.
Ultra Thin Flexible LCD Display—Plastic Film Base Material; Information was available at website; http://thecoolgadqets.com/ultra-thin-flexible-lcd-display-plastic-film-base-material/; in some form no later than May 25, 2011. While no copy of the website as it existed on May 25, 2011, is in Applicant's possession, Applicant has provided a copy of the website that was printed on Dec. 13, 2012.

(56) References Cited

OTHER PUBLICATIONS

Wada et al., High Efficiency Near IR Emission of Nd(III) Based on Low Vibrational Environment in Cages of Nano Sized Zeolites, J. Am. Chem. Soc., 2000, p. 8583, vol. 122.

What is Edge LED, Dynamic Edge LED, and Intelligent Peak LED Backlight? Information was available at website: http://www.sony.com.au.support/faq/454240; in some form no later than May 25, 2011. While no copy of the website as it existed on May 25, 2011, is in Applicant's possession, Applicant has provided a copy of the website that was printed on Dec. 13, 2012.

What is Reflex Technology?, information was available at website: http://www.kentdisplays.com/technology/reflextechnology.html; in some form no later than May 25, 2011. While no copy of the website as it existed on May 25, 2011, is in Applicant's possession, Applicant has provided a copy of the website that was printed on Oct. 15, 2012.

* cited by examiner

LIGHT GUIDE STRUCTURES AND DISPLAY DEVICES

CLAIM FOR PRIORITY

This application is the U.S. national phase entry under 35 U.S.C. §371 of PCT/JP2012/003906, filed Jun. 14, 2012, the entire disclosure of which is hereby incorporated by reference herein.

BACKGROUND

There are high expectations for reflective displays, such as e-paper, cholesteric displays, and interferometric modulation displays, as the next generation of displays having the characteristics of low power consumption and an excellent reflective constant ratio. Such reflective displays require a light guide structure to emit white light toward their display panel, but conventional light guide structures, such as those using a mirror to irradiate white light toward a display panel from a front edge thereof, or those configured to provide white light toward a display panel from a side edge thereof, are unsuitable for reflective displays having a large display area, because it is difficult to obtain a uniform light intensity distribution throughout such a large display area by using such conventional light guide structures. Therefore, a demand exists for light guide structures capable of emitting white light having a uniform light intensity distribution throughout a large display area.

DETAILED DESCRIPTION

Figure 1:
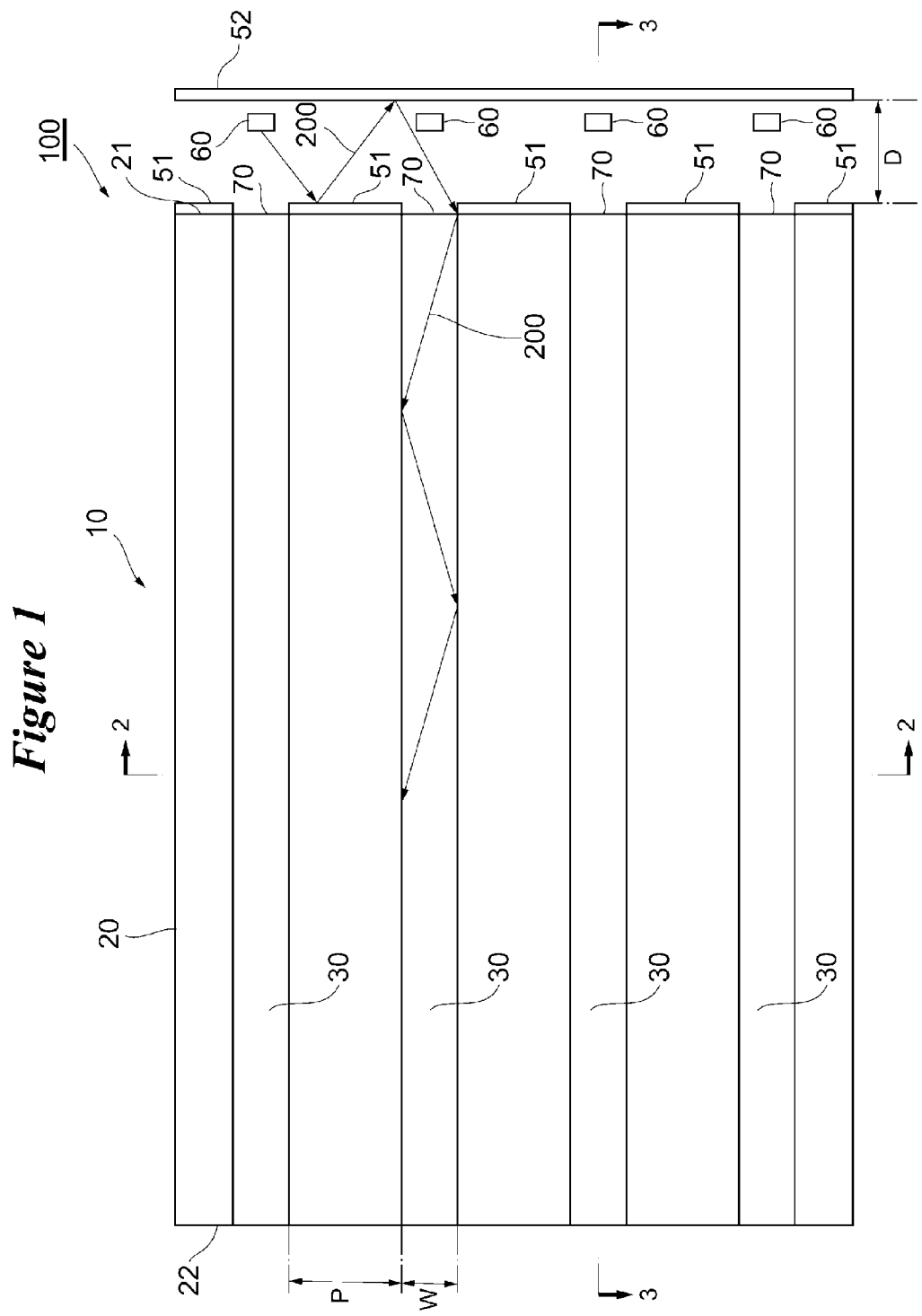
FIG. 1 shows a top view of a light guide structure in accordance with an embodiment of the present disclosure.

A light guide structure according to an embodiment described herein may be provided with a plurality of transparent light guide members, each transparent light guide member extending from a first end of a transparent plate to a second end of the transparent plate along one surface of the transparent plate and being configured to emit white light in response to light applied thereto. Due to the plurality of transparent light guide members extending from the first end to the second end along the one surface of the transparent plate, the light guide structure can provide the white light having a uniform light intensity distribution throughout a display panel.

In the following detailed description, reference is made to the accompanying drawings, which form a part hereof. In the drawings, similar symbols typically identify similar components, unless context dictates otherwise. Further, the drawings are intended to be explanatory and may not be drawn to scale. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Figure 2:
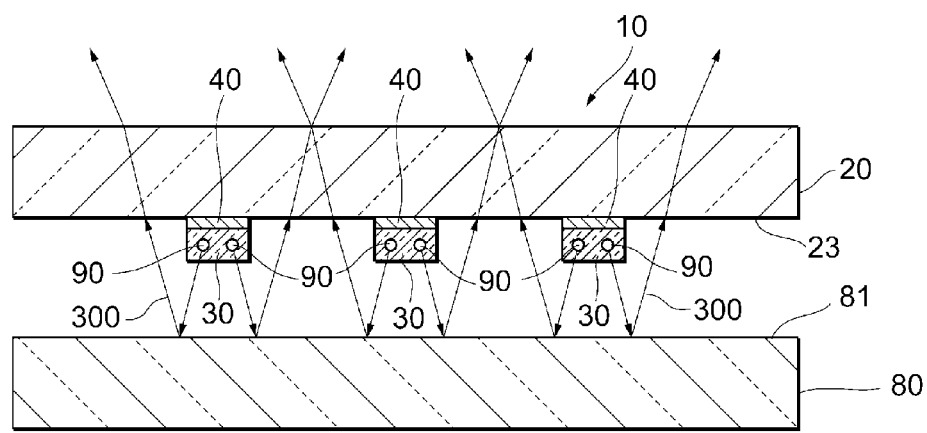
FIG. 2 shows a cross-sectional view of a light guide structure taken along line 2-2 of FIG. 1.
Figure 3:
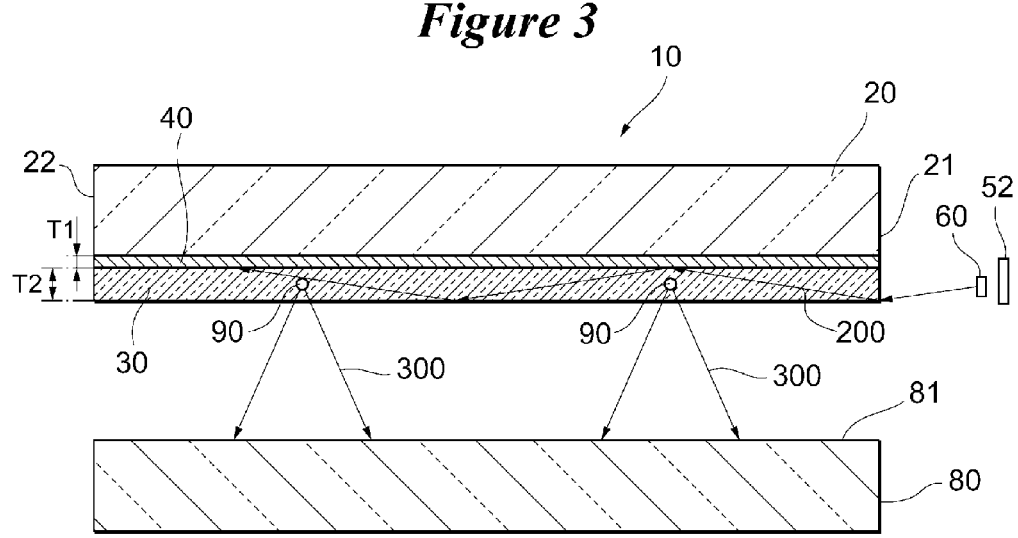
FIG. 3 shows a cross-sectional view of a light guide structure taken along line 3-3 of FIG. 1.

FIG. 1 shows a top view of a light guide structure 10 in accordance with an embodiment of the present disclosure. FIG. 2 shows a cross-sectional view of the light guide structure 10 taken along line 2-2 of FIG. 1. FIG. 3 shows a cross-sectional view of the light guide structure 10 taken along line 3-3 of FIG. 1.

As shown in FIGS. 1-3, the light guide structure 10 may be arranged to face a front surface 81 of a display panel 80 so as to provide white light 300 to the display panel 80. For example, the display panel 80 may be a reflective display panel, such as an e-paper, a cholesteric display, or an interferometric modulation display. The light guide structure 10 may be provided with a transparent plate 20 and a plurality of transparent light guide members 30. One surface 23 of the transparent plate 20 may face the display panel 80. A planar shape of the transparent plate 20 may include an arbitrary shape, such as a polygonal shape (e.g., a triangular shape, a quadrilateral shape, a pentagonal shape, or a hexagonal shape). The transparent plate 20 may have a first end 21 and a second end 22. When the planar shape of the transparent plate 20 is a quadrilateral shape, the second end 22 may be an opposite end of the first end 21. The transparent plate 20 may be made of a light transmissive material, such as a transparent resin or a transparent glass. For example, polyethylene, polypropylene, cyclo olefin polymer, polystyrene, polyacrylonitrile, polymethyl methacrylate, polyamide, polycarbonate, polyethylene terephthalate, polybutylene terephthalate, polyethylene naphthalene, or triacetyl cellulose may be used for the transparent plate 20.

Each transparent light guide member 30 may extend from the first end 21 to the second end 22 along one surface 23 of the transparent plate 20 so as to emit white light 300 in response to light 200 applied thereto. In one non-limiting aspect of the present disclosure, each transparent light guide member 30 may contain fluorescent substances 90, such as a combination of at least one red fluorescent substance, at least one green fluorescent substance, and at least one blue fluorescent substance, so as to emit the white light 300 in response to the applied light 200.

The fluorescent substances 90 may be metal complexes capable of being excited by the applied light 200 so as to emit fluorescent light. For example, the fluorescent substances 90 may be selected from the group consisting of a europium complex, a niobium complex, a praseodymium complex, a neodymium complex, a samarium complex, a gadolinium complex, a terbium complex, a dysprosium complex, a holmium complex, an erbium complex, a thulium complex and an ytterbium complex. Specifically, one of the fluorescent substances 90 may be any one selected from the group consisting of complexes represented by the following formulae 1 to 10;

Formula 1

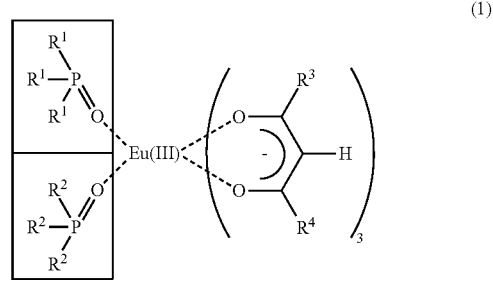

(1)

(wherein, $R^1$, $R^2$, $R^3$ and $R^4$ each independently represent an organic group, and $R^1$ and $R^2$ differ from each other.)

Formula 2

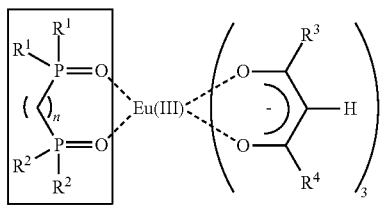

(2)

(wherein, $R^1$, $R^2$, $R^3$ and $R^4$ each independently represent an organic group, and $R^1$ and $R^2$ differ from each other.)

Formula 3

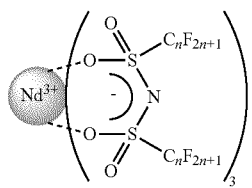

(3)

(wherein, n is an integer of from 1 to 18 inclusive.)

Formula 4

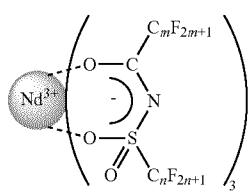

(4)

(wherein, m and n are each independently integers of from 1 to 18 inclusive.)

Formula 5

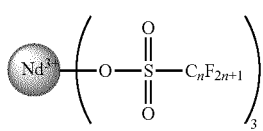

(5)

(wherein, n is an integer of from 1 to 18 inclusive.)

Formula 6

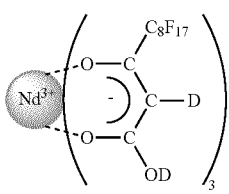

(6)

(wherein, n is an integer of from 1 to 18 inclusive, and D represents deuterium.)

Formula 7

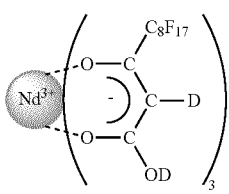

(7)

(wherein, D represents deuterium.)

Formula 8

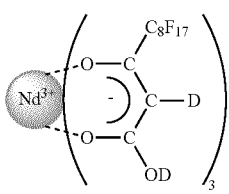

(8)

(wherein, D represents deuterium.)

Formula 9

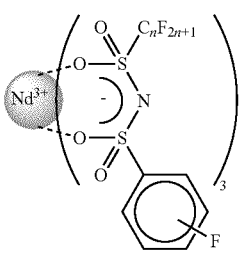

(9)

(wherein, n is an integer of from 1 to 18 inclusive.)

Formula 10

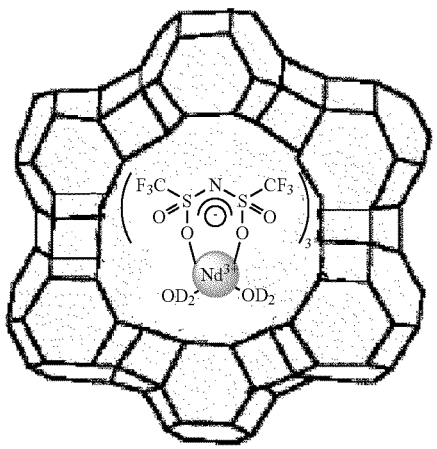

(10)

(wherein, D represents deuterium.)

A combination of red light emitted from a red fluorescent substance (e.g., the europium complex), green light emitted from a green fluorescent substance (e.g., the terbium complex), and blue light emitted from a blue fluorescent substance (e.g., the neodymium complex) can produce the white light 300.

The fluorescent substances 90 are not limited to the above explained metal complexes. Instead of the metal complexes, each transparent light guide member 30 may contain any fluorescent substances, such as organic fluorescent substances, which are capable of emitting fluorescent light.

Each transparent light guide member 30 may further contain a polymer matrix, such as a polymethyl methacrylate resin, in which the fluorescent substances 90 are dissolved.

The light guide structure 10 may further be provided with a plurality of reflection members 40. Each reflection member 40 may be arranged between the one surface 23 and one of the plurality of transparent light guide members 30 to reflect the applied light 200 so as to direct the applied light 200 to propagate within one of the plurality of transparent light guide members 30 from the first end 21 to the second end 22 along the one surface 23. In one non-limiting example, one reflection member 40 and one transparent light guide member 30 may be stacked on the one surface 23. Each reflection member 40 may be formed of a metal layer, such as an aluminum layer, a silver layer, or a gold layer. Alternatively, each reflection member 40 may be formed of an oxidized metal layer, such as an oxidized aluminum layer, an oxidized titanium layer, or a zinc oxide layer.

The light guide structure 10 may further be provided with a plurality of first reflectors 51, at least one second reflector 52, and a plurality of apertures 70. Each first reflector 51 may be formed between two adjacent ends of the plurality of transparent light guide members 30. The at least one second reflector 52 may be configured to reflect the light 200 between each of the plurality of first reflectors 51 and the at least one second reflector 52. Each aperture 70 may be arranged between two adjacent first reflectors 51 to introduce the reflecting light 200 between each of the plurality of first reflectors 51 and the at least one second reflector 52 into one of the plurality of transparent light guide members 30. A distance D between each of the plurality of first reflectors 51 and the at least one second reflector 52 may be about 0.1 centimeters to about 2 centimeters. Each first reflector 51 and the at least one second reflector 52 may be formed of a metal layer, such as an aluminum layer, a silver layer, or a gold layer. Alternatively, each first reflector 51 and the at least one second reflector 52 may be formed of an oxidized metal layer, such as an oxidized aluminum layer, an oxidized titanium layer, or a zinc oxide layer.

The light guide structure 10 may further be provided with one or more light sources 60 configured to emit the light 200 having a wavelength sufficient to excite the fluorescent substances 90. Depending on the types of the fluorescent substances 90 used, the wavelength of the light 200 may be within an ultraviolet wavelength range (e.g., 210 nanometers, 365 nanometers, 375 nanometers, 385 nanometers). Specifically, each of the light sources 60 may be an ultraviolet light emitting diode. Each of the light sources 60 may be located between each of the plurality of first reflectors 51 and the at least one second reflector 52. Depending on the required level of brightness and the locations of the light sources 60, the number of the light sources 60 may be from about 2 to about 30.

In one non-limiting aspect of the present disclosure, the plurality of transparent light guide members 30 may be arranged in parallel rows along the one surface 23. Further, the plurality of transparent light guide members 30 may be spaced from each other at an equal pitch P. For example, each transparent light guide member 30 may have a width W of less than about 50 micrometers. The width W may be from about 10 micrometers to about 20 micrometers. Each of the transparent light guide members 30 may have a thickness T1 of from about 20 micrometers to about 200 micrometers. Each reflection member 40 may have a thickness T2 of less than about 1 micrometer. The thickness T2 may be from about 200 nanometers to about 400 nanometers. The pitch P may be less than about 1 millimeter. Specifically, the pitch P may be several hundred micrometers (e.g. 150 micrometers).

Due to the plurality of transparent light guide members 30 extending from the first end 21 to the second end 22 and being arranged in parallel rows along the one surface 23, the light guide structure 10 can provide the white light 300 having a uniform light intensity distribution throughout the front surface 81 of the display panel 80, even if the front surface 81 is large to such an extent that a conventional light guide structure cannot sufficiently provide white light having a uniform light intensity distribution throughout the front surface 81.

In one non-limiting aspect of the present disclosure, a display device 100 may be provided with the display panel 80, the light source 60 configured to emit the light 200, the transparent plate 20 having the first end 21 and the second end 22 wherein the one surface 23 of the transparent plate 20 faces the display panel 80, and the plurality of transparent light guide members 30, each transparent light guide member 30 extending from the first end 21 to the second end 22 along the one surface 23 of the transparent plate 20 and being configured to emit the white light 300 in response to the light 200 applied thereto.

EXAMPLES

Example 1

Manufacturing a Light Guide Structure

A polymethyl methacrylate resin is used to produce the transparent plate 20 having a surface area of about 1200 square centimeters through a plastic processing. Next, aluminum is used to print the plurality of reflection members 40 in such a manner that each reflection member 40, having a thickness of about 300 nanometers, is printed on the one surface 23 from the first end 21 to the second end 22 through a screen printing. Next, using the europium complex, the terbium complex, and the neodymium complex as the red fluorescent substance, the green fluorescent substance, and the blue fluorescent substance respectively, these complexes are dissolved in a polymethylmethacrylate resin, and then printed on each reflection member 40 through the screen printing to produce the plurality of transparent light guide members 30, each having a thickness of about 100 micrometers, in such a manner that each of the transparent light guide members 30 is stacked on one of the plurality of reflection members 40. Through the above-explained method, the light guide structure 10 provided with the transparent plate 20 and the plurality of transparent light guide members 30 is manufactured.

Example 2

Measuring a Light Intensity Distribution

Using the light guide structure 10 manufactured through the above-described Example 1, a light intensity distribution of white light emitted from the light guide structure 10 toward the display panel 80 is measured. The measured light intensity distribution will be found to be substantially uniform.

While the present disclosure has been described with respect to a limited number of embodiments, a person skilled in the art, having the benefit of this disclosure, would appreciate that other embodiments can be devised which do not depart from the scope of the present disclosure as disclosed herein. Accordingly, the scope of the invention should be limited only by the attached claims.

The invention claimed is:

1. A light guide structure, comprising:
a transparent plate having a first end and a second end;
a plurality of transparent light guide members, wherein each transparent light guide comprises a combination of a red fluorescent substance, a green fluorescent substance and a blue fluorescent substance, each transparent light guide member extending from the first end to the second end along one surface of the transparent plate and being configured to emit white light in response to light applied thereto; and
a plurality of reflection members, each reflection member being arranged between the one surface of the transparent plate and one of the plurality of transparent light guide members and being configured to reflect the applied light so as to direct the applied light to propagate within one of the plurality of transparent light guide members along the one surface of the transparent plate.

2. The light guide structure of claim 1, wherein each reflection member has a thickness of less than about 1 micrometer.

3. A display device, comprising:
a display panel;
a light source configured to emit light;
a transparent plate having a first end and a second end wherein one surface of the transparent plate faces the display panel; and
a plurality of transparent light guide members, wherein each transparent light guide comprises a combination of a red fluorescent substance, a green fluorescent substance and a blue fluorescent substance, each transparent light guide member extending from the first end to the second end along the one surface of the transparent plate and being configured to emit white light in response to the light applied thereto.

4. The display device of claim 3, wherein the display panel is a reflective display panel.

5. The display device of claim 3, further comprising a plurality of reflection members, each reflection member being arranged between the one surface of the transparent plate and one of the plurality of transparent light guide members and being configured to reflect the applied light so as to direct the applied light to propagate within one of the plurality of transparent light guide members along the one surface of the transparent plate.

6. The display device of claim 5, wherein each reflection member has a thickness of less than about 1 micrometer.

* * * * *